(12) United States Patent
Eaton, Jr.

(10) Patent No.: US 6,592,106 B1
(45) Date of Patent: Jul. 15, 2003

(54) LOCKING HINGED JOINT FOR VAPOR-LIQUID CONTACT TRAYS

(75) Inventor: Raymond H. Eaton, Jr., Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 55 days.

(21) Appl. No.: 10/041,886

(22) Filed: Jan. 8, 2002

(51) Int. Cl.[7] .................................................. B01F 3/04
(52) U.S. Cl. .................................. 261/114.3; 261/114.5
(58) Field of Search .......................... 261/114.1, 114.2, 261/114.3, 114.4, 114.5; 202/158

(56) References Cited

U.S. PATENT DOCUMENTS

| | | | |
|---|---|---|---|
| 3,233,708 A | * | 2/1966 | Glitsch |
| 4,120,919 A | | 10/1978 | McClain |
| 4,133,852 A | * | 1/1979 | DiNicolantonio et al. |
| 6,068,244 A | * | 5/2000 | Burton et al. ............ 261/114.4 |
| 6,422,539 B1 | * | 7/2002 | Burton et al. ............ 261/114.5 |

FOREIGN PATENT DOCUMENTS

GB  1041690  * 9/1966  ............... 261/114.1

OTHER PUBLICATIONS

Glitsch Canada Ltd., five sketches of standard minute manway, dated May 27, 1982, May 28, 1982 and Jun. 2, 1982.
"Design and Revamp of Modern C2 Splitters Using High Capacity Internals and Fast Installation Techniques" published in ERTC Petrochemical 2000, Amsterdam, NL, pp. 1–13.

"Fractionation Trays," Metawa–Tray B.V. Brochure, undated.

* cited by examiner

*Primary Examiner*—C. Scott Bushey
(74) *Attorney, Agent, or Firm*—Shook, Hardy & Bacon L.L.P.

(57) ABSTRACT

A vapor-liquid contact tray is provided with at least two tray panels that are releaseably together along their overlapped margins by a locking hinged joint. The joint is formed by fingers in one tray panel that extend through slots located in the other tray panel. Offset bends are formed in the tray panels so that the overlapped margins do not extend above the top surface of the tray. The hinged joint includes a locking mechanism that prevents lateral separation of the tray panels once they have been releaseably joined together. The locking mechanism is formed by a downturned locking flange positioned between the fingers in one of the tray panels and extending downwardly into and, preferably through, openings located in the overlapped margin of the other tray panel.

16 Claims, 2 Drawing Sheets

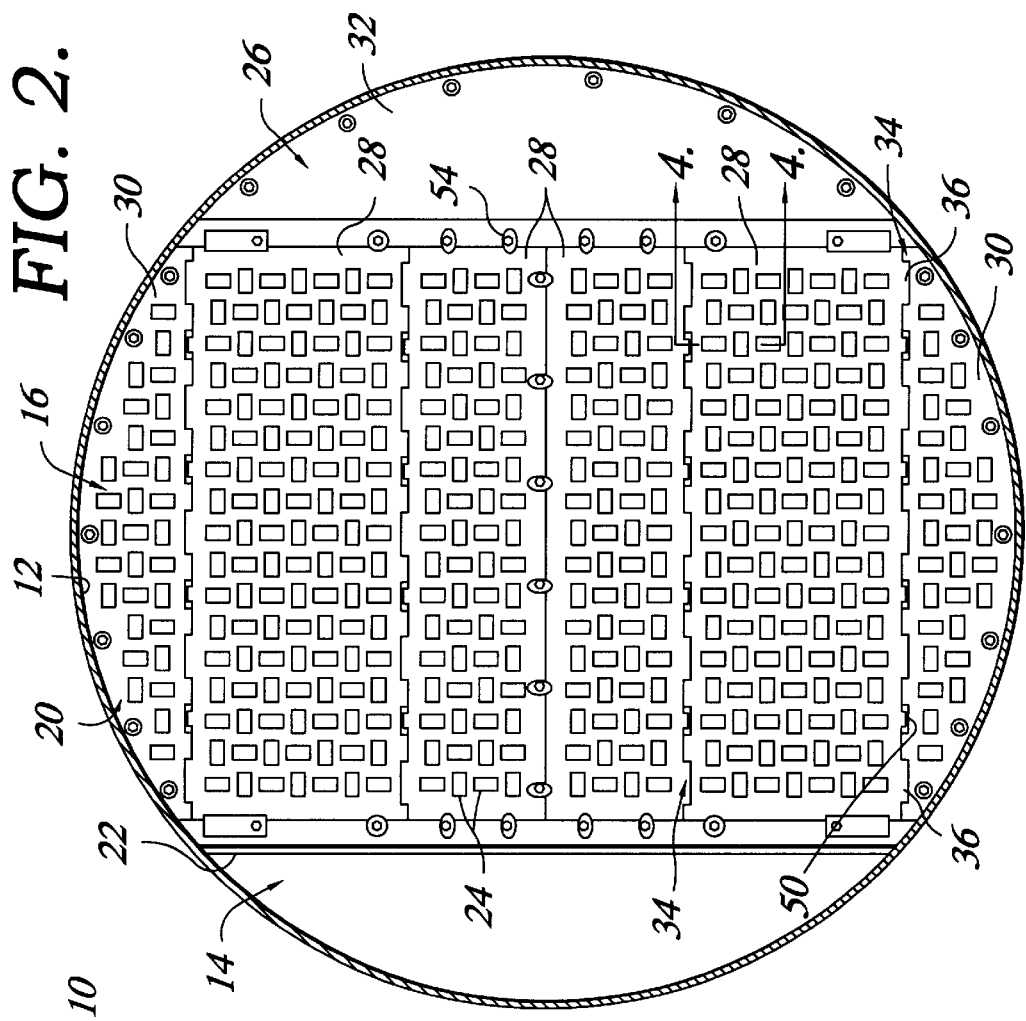
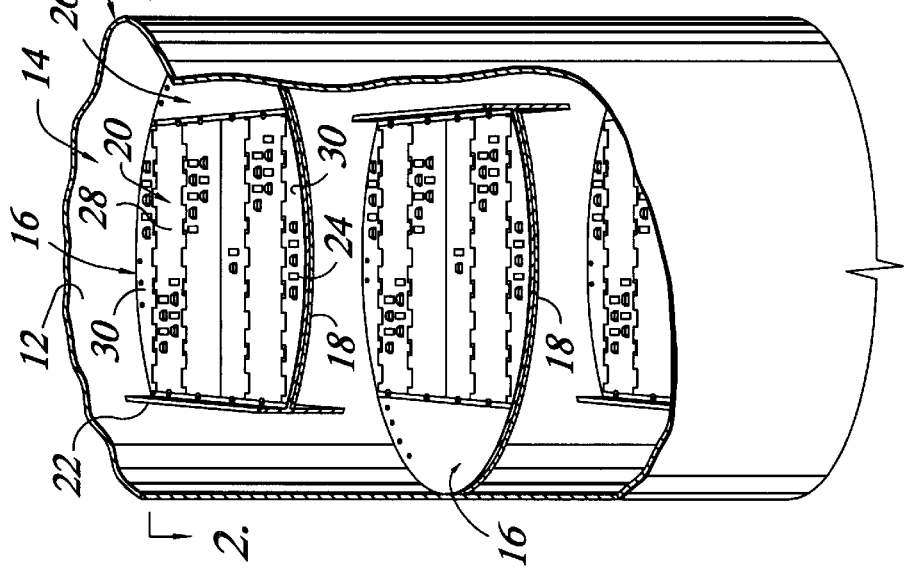

LOCKING HINGED JOINT FOR VAPOR-LIQUID CONTACT TRAYS

BACKGROUND OF THE INVENTION

The present invention is directed to mass transfer devices and, more particularly, to vapor-liquid contact trays and methods of assembling such trays.

Trays, such as counter-flow trays and cross-flow trays, are commonly used in mass transfer columns to promote contact and mass transfer between ascending and downwardly flowing fluid streams. The ascending fluid is typically vapor and the descending fluid is typically liquid, although liquid-liquid and vapor-vapor systems are also known. Each tray normally extends horizontally across substantially the entire horizontal cross section of the column and is supported around its perimeter by a ring welded to the inner surface of the circular column wall or shell. Various trusses or beams are also used to provide intermediate support for the tray.

It Vapor-liquid contact trays of the type described above contain one or more downcomers that are positioned at openings in the tray to provide passageways for liquid to descend from one tray to an adjacent lower tray. Prior to entering the downcomer, the liquid travels along the tray upper surface and interacts with ascending vapor that passes through valves or other openings provided in selected portions of the tray deck. That portion of the tray deck containing vapor openings is commonly referred to as the "active area" because of the vapor and liquid mixing and frothing that occurs above the tray. In order to increase the vapor handling capacity and mass transfer efficiency of the tray, it is generally desirable to maximize the active area of the tray by providing vapor openings in as much of the tray deck as possible.

In order to facilitate installation and removal of the above described trays within a column, the trays are typically fabricated in smaller pieces or panels that are sized to fit through openings or manways in the column shell. Once the tray panels are carried through the manways, they are placed on the support beams with the edges of each tray panel overlapping the edges of adjacent tray panels. The tray panels are then typically bolted together along their overlapped edges to resist against lifting or separation of individual tray panels, either by the upward force that is exerted by the ascending vapor stream, or by the vibrations that can occur during operation of the column.

Bolting the multiple tray panels together for each of the numerous trays typically found in a mass transfer column is an extremely labor intensive and time consuming process. In order to reduce the assembly time, a hinged joint has been previously developed to join together adjacent tray panels without requiring the use of bolts. This hinged joint is formed by constructing spaced apart tabs that extend outwardly along the edge of one tray panel and complementally sized and positioned slots spaced a preselected distance from the edge of an adjacent tray panel. The tabs are then inserted into the slots by slightly elevating the opposite end of one of the tray panels, sliding the tabs into the slots, and then lowering the raised end of the tray panel to a horizontal position.

While the hinged joint described above allows for more rapid assembly of tray panels, it does not lock the tray panels together and they may become separated as a result of operational vibrations within the column or if the tray should bow upwardly under the force of high vapor flow rates. In order to resist against separation of the tray panels under anticipated vapor flow rates, the tabs must be of sufficient length so that they do not slip out of the slots when the tray panels bow upward. These longer tabs, however, may overlap and impede the flow of vapor through any vapor openings or valves that are provided near the hinged joint. As a result, the tabs reduce the active area available on the tray deck for vapor and liquid interaction. Another disadvantage of the conventional hinged joint is the overlapped portions of the tray panels are elevated above the surrounding portions of the tray by the thickness of one tray panel. This elevated portion of the tray forms a hump that can disrupt the desired liquid flow pattern along the upper surface of the tray deck and can interfere with the placement of weirs or other structural components on the tray deck.

A need has thus developed for a way to quickly join together adjacent tray panels in a manner that reduces the risk of inadvertent separation during use or installation, does not impede the desired liquid flow pattern on the tray surface, and allows the vapor openings to be positioned more closely to the joint.

SUMMARY OF THE INVENTION

In one aspect, the present invention is directed to a vapor-liquid contact tray having a plurality of individual planar tray panels that are joined together to form a tray deck having a planar upper surface. Liquid streams flow along the upper surface of the tray panels and interact with vapor ascending through valves provided in the tray panels. At least two of the tray panels are releaseably joined together by a hinged joint formed along overlapping edge portions of the tray panels. The hinged joint is formed in part by fingers that extend outwardly from one tray panel and are received within slots located in the adjacent tray panel. The fingers have a distal segment and a proximal or attached segment and a first offset bend formed therebetween so that the distal segment is located in a plane underlying the attached segment. A second offset bend is formed in the adjacent tray panel near the overlapped edge portion and places the overlapped edge portion in a plane underlying the main body of the tray panel. The finger receiving slots are located in the second offset bend and are positioned so that the fingers extend through the slots and engage an undersurface of the adjacent tray panel. The hinged joint also includes a locking mechanism comprising at least one downturned locking flange formed in the overlapping edge portion of the one tray panel and extending downward into an opening in the overlapped edge portion of the adjacent tray panel. The hinged joint allows the tray panels to be quickly and easily assembled, with the locking mechanism securing the tray panels against inadvertent horizontal separation during operation of the column. The presence of the locking mechanism allows the fingers to be of a length sufficient to provide vertical support for the adjacent tray panel without the need for additional length to resist lateral separation. As a result, the vapor flow valves or openings can be placed close to the hinged joint to increase the tray active area without interference by the fingers blocking vapor entry into the valves. Advantageously, the construction of the hinged joint allows the overlapped margins of the tray panels to be positioned at or below the top surface of the main bodies of the trays so that disruptions in the flow of liquid across the top surface of the trays are not experienced. The planar hinged joint also facilitates placement of weirs or other structural components on the tray because notches or bends need not be formed in the structural components as is required by the presence of a hump in conventional hinged joints.

In another aspect, the invention is directed to method of assembling tray panels using the hinged joint described above.

BRIEF DESCRIPTION OF THE DRAWINGS

In accompanying drawings which form part of the specification and are to be read in conjunction therewith and in which like reference numerals are used to indicate like parts in the various views:

FIG. 1 is a fragmentary perspective view of a mass transfer column containing vapor-liquid contact trays of the present invention;

FIG. 2 is an enlarged top plan view of one of the vapor-liquid contact trays taken in horizontal section along line 2—2 in FIG. 1;

DETAILED DESCRIPTION OF THE PREFERRED EMBODIMENTS

Figure 4:
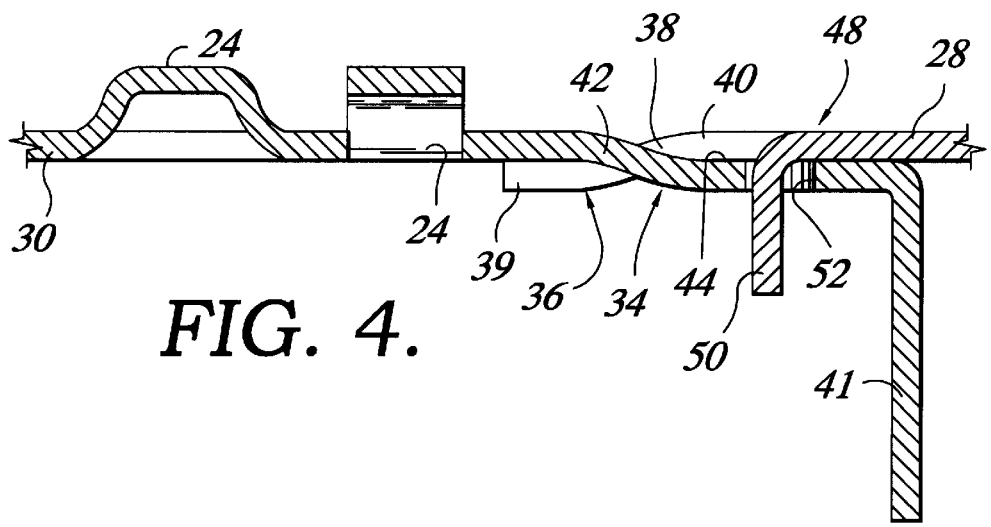
FIG. 4 is a rotated fragmentary view of the tray panels showing the locking hinged joint in greater detail and taken in vertical section along line 4—4 in FIG. 2.

Turning now to the drawings in greater detail and initially to FIG. 1, a mass transfer or heat exchange column is designated generally by the numeral 10 and includes an upright cylindrical shell 12 which defines an open interior region 14 in which a plurality of fluid-fluid contact trays 16 are located. The trays 16 are normally used for facilitating vapor-liquid fractionation or other contact, but may also be used in liquid-liquid and vapor-vapor applications. Column 10 is of a type used for processing liquid and vapor streams, including to obtain fractionation products. Although column 10 is shown in a cylindrical configuration, other shapes, including polygonal, may be used. The column 10 is of any suitable diameter and height, and is constructed from suitably rigid materials that are preferably inert to, or otherwise compatible with, the fluids and conditions present within the column.

One or more liquid streams can be directed to the column 10 in a conventional manner through feed lines which are not shown because of their conventional nature. Likewise, one or more vapor streams can be charged to the column or can be generated within the column 10. In addition to trays 16, internals such as beds of packing are normally located within the column 10 to carry out other desired processing of the liquid and vapor streams. Other appropriate system components such as connections and lines for feed, product removal and reflux streams, reboilers, condensers, and the like are not illustrated because of their conventional nature.

Trays 16 are positioned in vertically spaced apart relationship within the interior region 14 of column 10. Each tray 16 extends across substantially the entire cross section of column 10 and is supported along its perimeter by rings 18 attached to the inner surface of column shell 12. Beams (not shown) may extend across the column 10 to provide additional support for the trays.

Each tray 16 comprises a tray deck 20 and one or more downcomers 22 that convey liquid from the tray deck 20 to an underlying tray. The tray deck 20 includes a plurality of openings, devices or valves 24 that allow vapor to ascend through the tray 16 for interaction with liquid traveling across the tray deck 20. The portion of the tray deck 20 containing valves 24 is known as the active area of the tray 16. Another portion of the tray deck 20, known as the inlet area 26, receives liquid discharged from the outlet of the overlying downcomer and is normally imperforate to prevent the discharged liquid from weeping through the tray 16 at the inlet area 26.

The tray deck 20 comprises a plurality of rectangular-shaped center panels 28 and chordal-shaped side panels 30 that are joined together in side-by-side relationship. An inlet panel 32 containing imperforate inlet area 26 is joined to one end of the center panels 28. The downcomer 22 is positioned at the other end of the center panels 28. The number, size and arrangement of panels 28, 30 and 32 can be varied as desired or required for particular applications. For example, the panels 28 and 30 could extend in the opposite direction with one or both ends of each panel containing a radius, one or more of the panels 28 and 30 could be square-shaped, and the center panels 28 could be omitted. Similarly, the number and placement of downcomers 22 and the type and arrangement of valves 24 can be varied from that which is illustrated in the drawings.

Figure 3:
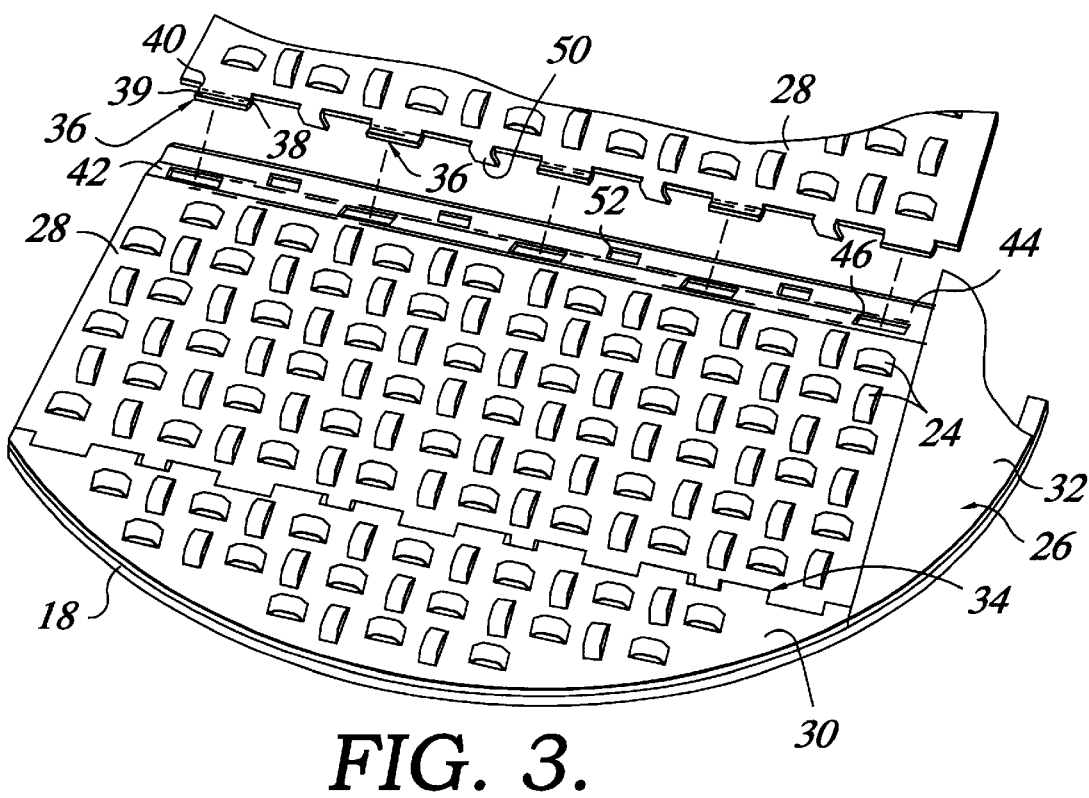
FIG. 3 is top perspective view of two tray panels with phantom lines illustrating the manner in which the panels are releaseably joined together by formation of a locking hinged joint of the present invention.

Turning more specifically to FIGS. 2–4, the present invention resides in the use of a locking hinge joint 34 that releasably joins together overlapped edge portions of at least some of the tray panels, such as panels 28 and 30, without requiring the use of nut and bolt assemblies. Although the hinged joint 34 is hereafter described in relation to adjacent panels 28 and 30, it is to be understood that hinged joints 34 can also be used to join together edge portions of any adjacent panels, including center panels 28 as illustrated in the drawings. The hinged joint 34 is formed in part by providing spaced apart fingers 36 along an edge of one of the tray panels 28. The fingers 36 are attached to and are preferably formed as a continuous extension of the main portion of the panel 28. A slight offset bend 38 is centrally located in each finger 36 and is formed so that a distal portion 39 of the finger lying beyond the offset bend 38 is parallel to an attached end portion 40 of the finger 36. The offset bend 38 also causes the distal portion 39 of the finger 36 to be displaced downwardly beneath the attached end portion 40 by a distance corresponding to the thickness of the material used to form the panel 28. In this manner, the finger 36 forms a joggle which interconnects with the overlapped edge portion of the adjacent tray panel 30 in the manner described below.

The overlapped edge of the adjacent tray panel 30 includes a stiffening downturned flange 41. The portion of the hinged joint 34 formed in the overlapped panel 30 includes a slight offset bend 42 that is provided in the panel 30 so that its edge portion 44 is displaced below the plane of the main body of panel 30 by a distance corresponding to the thickness of the material used to form the panel 30. As a result, a joggle is formed along the edge of the panel 30 in a manner similar to the adjacent panel 28.

The hinged joint 34 also includes a series of spaced apart slots 46 located in offset bend 42 at positions corresponding to the location of fingers 36 in the overlapping panel 28. Insertion of fingers 36 into the slots 46 allows interconnection of the adjacent panels 28 and 30. After the panels 28 and 30 have been interconnected in this manner to form the hinged joint 34, the fingers 36 engage and support the undersurface of the tray panel 30 to resist the vertical loads applied to the panels 28 and 30 during operation of the column 10. The slots 46 are preferably sized slightly wider than the fingers 36 to permit slight lateral adjustment of the panels 28 and 30 during installation. Notably, it can be seen that the joggles provided in the edges of the tray panels 28 and 30 position the fingers 36 and slots 46 beneath the plane of the main body of the panels so that no portion of the hinged joint 34 extends above that plane. As a result, the hinged joint 34 of the present invention does not form an elevated hump as is the case with conventional hinged joints. The planar hinged joint 34 thus avoids the disruption of liquid flow along top surface of the tray 16 that can be caused by the elevated hump in conventional hinged joints. In addition, the hinged joint 34 permits the ready attachment of weirs and other structural components to the tray panels 28 and 30 without the disruptions created by the elevated hump in conventional joints.

The hinged joint 34 also includes a locking mechanism 48 that resists separation of the tray panels 28 and 30 once they have been interconnected. Locking mechanism 48 comprises one or more downturned locking flanges 50 that are positioned between the fingers 36 on panel 28. The locking flanges 50 are preferably aligned with the attached portions 40 of fingers 36 and are received within openings 52 provided in the downwardly displaced edge portion 44 of the adjacent tray panel 30. When received within openings 52, the locking flanges 50 prevent lateral separation of the tray panels 28 and 30. The openings 52 are preferably sized slightly wider than the width of the flanges and have a length sufficient to allow slight rearward and lateral adjustment of the panels 28 and 30 during installation of the tray. The openings 52 should otherwise be sized to minimize the open area available for undesired vapor and liquid flow through the openings 52.

The openings 52 are positioned so that the locking flanges 50 may be inserted within the openings 52 once the fingers 36 have reached the forward limit of their insertion within their associated slots 46. It will be appreciated that the tray panels 28 and 30 must be positioned in angled relationship as they are first interconnected so that the lower edge of the locking flange 50 is elevated above the plane of the displaced edge portion 44 of the overlapped panel 30. Because the clearance between vertically adjacent trays 16 may be greatly restricted in certain applications, it is desirable that the vertical length of locking flange 50 in those application be relatively short so that the tray panel 28 can be elevated within the available clearance. In general, the locking flange 50 should have a vertical length equal to and preferably greater than the thickness of the material used to form the tray panel 30. In applications where greater clearance between trays 16 is available, the length of the locking flange 50 can be increased because there is more room to maneuver the tray panel 30. These longer lengths are generally preferred in order to provide greater resistance to inadvertent separation of the tray panels 28 and 30.

The number of locking flanges 50 provided for each hinged joint 34 can be varied as desired. For example, in some applications it may be desirable to position locking flanges 50 between each pair of fingers 36. In other applications, a single locking flange 50 may be sufficient. Although the locking flanges 50 are illustrated as extending downwardly at an angle of 90°, they may extend at greater or lesser angles, with angles of between 45° and 110° being generally preferred. Where greater resistance to inadvertent separation of the tray panels 28 and 30 is desired, angles greater than 90° are preferred. If the locking flange 50 has a relatively long vertical length, angles less than 90° may be preferred because the greater length of the flange 50 provides greater resistance to panel separation and the smaller angle facilitates insertion of the locking flange 50 into the opening 52.

Although the hinged joint 34 has been described with respect to one edge of tray panels 28 and 30, it will be appreciated that the hinged joints 34 may also be provided along the opposite edges as well as along the overlapped margins of other panels 28, 30 and 32. Normally, one or more of those overlapped margins will be secured using conventional nut and bolt assemblies 54 to allow one or more of the panels to function as a removable manway after the tray 16 has been installed within the column 10.

It can be seen that the locking flanges 50 prevent lateral separation of the hinged joint 34 even when the tray 16 is subjected to lifting or vibrational forces during operation of the column 10. The locking flanges 50 thus allow the engagement fingers 36 to be of a shorter length than the fingers in conventional hinged joints where they must also function to resist this lateral separation. Because the fingers 36 are shorter, valves 24 can be placed closer to the hinged joint 34 without being blocked by the fingers 36. This allows the active area where vapor-liquid interaction occurs to be extended closer to the hinged joint, thereby increasing the tray capacity and efficiency.

Assembly of the hinged joint 34 is accomplished by simply positioning the tray panels 28 and 30 in side-by-side relationship and then elevating the opposite side of either or both of the panels. Once the panels 28 and 30 have been placed in this angled relationship, the tray panels are moved toward each other so that the fingers 36 are inserted through the slots 46. Once the fingers 36 have reached the forward limit of their travel, the elevated side(s) of the tray panels 28 and 30 are lowered to return the panels to a coplanar relationship. In so doing, the locking flanges 50 are inserted into the openings 50 and resist against lateral separation of the assembled tray panels 28 and 30. Disassembly of the tray panels 28 and 30 can be readily accomplished by simply reversing the foregoing sequence of steps. Assembly and disassembly of the tray panels 28 normally occurs while they are in a generally horizontal orientation. Alternatively, if the column is horizontally oriented during assembly of the internals, the panels 28 and 30 can be assembled while in a generally vertical orientation, with the locking flanges 50 providing the added benefit of holding the panels 28 and 30 together during assembly.

Various sheet metal forming methods can be used to form the several components of the hinged joint 34. For example, the slots 46 and 52, fingers 36 and locking flanges 50 can be formed using known forming processes. The offset bends 38 and 42 can be formed using a brake press, folding brake, cam brake or other known process. The locking flanges 50 are preferably formed in a wiping pinch press in which a bevel in an upper die slides along a bevel in a lower die to cause the upper die to pivot in the direction of the offset bend in the sheet metal.

From the foregoing, it will be seen that this invention is one well adapted to attain all the ends and objectives hereinabove set forth together with other advantages which are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A vapor-liquid contact tray comprising:
    first and second tray panels having coplanar main bodies and being releaseably joined together by a hinged joint formed along overlapping edge portions of said tray panels; and vapor flow valves positioned in said main bodies of the tray panels;

said hinged joint comprising:

fingers formed in said first tray panel and extending outwardly toward said second tray panel, said fingers having a distal segment and an attached segment and a first offset bend formed therebetween, said distal segment being located in a plane underlying said attached segment;

a second offset bend formed in said second tray panel adjacent said overlapped edge portion and placing said overlapped edge portion in a plane underlying said main body of the second tray panel;

slots in said second offset bend of the second tray panel and positioned so that said fingers extend through the slots and engage an undersurface of said second tray panel; and at least one downturned locking flange formed in said overlapping edge portion of said first tray panel and extending downward into an opening formed in said overlapped edge portion of said second tray panel.

2. The vapor-liquid contact tray of claim 1, wherein said locking flange extends downwardly through said openings in the second tray panel.

3. The vapor-liquid contact tray of claim 2, wherein said locking flange extends downwardly at an angle of between 45° and 110°.

4. The vapor-liquid contact tray of claim 3, wherein said locking flange extend downwardly at an angle of approximately 90°.

5. The vapor-liquid contact tray of claim 3, including a plurality of said locking flanges and said openings, and wherein said fingers are spaced apart and said locking flanges are positioned between said fingers.

6. The vapor-liquid contact tray of claim 1, wherein said first and second offset bends displace said distal segment of the fingers and said overlapped edge portion of the second tray panel are displaced downwardly by a distance such that said overlapped edge portions of the tray panels do not extend above a plane of an upper surface of said main bodies of the tray panels.

7. The vapor-liquid contact tray of claim 1, including a downcomer positioned at one end of said first and second tray panels.

8. A mass transfer column comprising a plurality of horizontally extending vapor-liquid contact trays positioned in vertically spaced apart relationship, at least one of said vapor-liquid contact trays comprising a tray deck having vapor passage openings and at least one downcomer, said tray deck comprising:

first and second tray panels having coplanar main bodies and being releaseably joined together by a hinged joint formed along overlapping edge portions of said tray panels;

vapor flow valves positioned in said main bodies of the tray panels;

said hinged joint comprising:

fingers formed in said first tray panel and extending outwardly toward said second tray panel, said fingers having a distal segment and an attached segment and a first offset bend formed therebetween, said distal segment being located in a plane underlying said attached segment;

a second offset bend formed in said second tray panel adjacent said overlapped edge portion and placing said overlapped edge portion in a plane underlying said main body of the second tray panel;

slots in said second offset bend of the second tray panel and positioned so that said fingers extend through the slots and engage an undersurface of said second tray panel; and at least one downturned locking flange formed in said overlapping edge portion of said first tray panel and extending downward into an opening located in said overlapped edge portion of said second tray panel.

9. The mass transfer column of claim 8, wherein said locking flange extends downwardly through said openings in the second tray panel.

10. The mass transfer column of claim 9, wherein said locking flange extends downwardly at an angle of between 45° and 110°.

11. The mass transfer column of claim 10, wherein said locking flange extend downwardly at an angle of approximately 90°.

12. The mass transfer column of claim 10, including a plurality of said locking flanges and said openings, and wherein said fingers are spaced apart and said locking flanges are positioned between said fingers.

13. The mass transfer column of claim 8, wherein said first and second offset bends displace said distal segment of the fingers and said overlapped edge portion of the second tray panel are displaced downwardly by a distance such that said overlapped edge portions of the tray panels do not extend above a plane of an upper surface of said main bodies of the tray panels.

14. A method of releaseably joining first and second tray panels, comprising the steps of:

tilting said first tray panel at a preselected angle in relation to said second tray panel and inserting fingers formed in said first tray panel through slots located in said second tray panel, said fingers having a distal segment and an attached segment and a first offset bend formed therebetween, said distal segment being located in a plane underlying said attached segment, said slots being located in a second offset bend positioned in said second tray panel adjacent said overlapped edge portion, said overlapped edge portion being in a plane underlying said main body of the second tray panel; and maneuvering said first and second tray panels into coplanar relationship so that said fingers engage an undersurface of said second tray panel and at least one downturned locking flange formed in said overlapping edge portion of said first tray panel extends downwardly into an opening located in said overlapped edge portion of said second tray panel to resist lateral separation of said first and second tray panels.

15. The method of claim 14, including the step of securing said second tray in a generally vertical orientation within a generally horizontally oriented column before said step of tilting said first tray panel at a preselected angle in relation to said second tray panel.

16. The method of claim 15, wherein said first and second tray panels are in a generally vertical orientation within said generally horizontally oriented column after said step of maneuvering said first and second tray panels into coplanar relationship.

\* \* \* \* \*